(12) United States Patent
Eberle, III

(10) Patent No.: US 8,287,206 B2
(45) Date of Patent: Oct. 16, 2012

(54) DECKING SYSTEM AND ANCHORING DEVICE

(75) Inventor: Harry W. Eberle, III, Califon, NJ (US)

(73) Assignee: Blue Heron Enterprises LLC, North Branch, NJ (US)

( * ) Notice: Subject to any disclaimer, the term of this patent is extended or adjusted under 35 U.S.C. 154(b) by 159 days.

(21) Appl. No.: 13/024,674

(22) Filed: Feb. 10, 2011

(65) Prior Publication Data

US 2011/0129293 A1 Jun. 2, 2011

Related U.S. Application Data

(62) Division of application No. 10/037,325, filed on Jan. 3, 2002, now Pat. No. 7,908,812.

(51) Int. Cl.
*E04B 2/30* (2006.01)
(52) U.S. Cl. .......... 403/12; 403/292; 403/381; 52/489.1
(58) Field of Classification Search .................. 403/12, 403/292, 293, 286, 381; 52/483.1, 489.1, 52/584.1, 586.1
See application file for complete search history.

(56) References Cited

U.S. PATENT DOCUMENTS

| | | |
|---|---|---|
| 186,463 A | 1/1877 | Dickinson |
| 239,846 A | 4/1881 | Ring |
| 466,995 A | 1/1892 | Abramson |
| 1,184,080 A | 5/1916 | D'arcy |
| 1,241,885 A | 10/1917 | Roeder |
| 1,990,001 A | 2/1935 | Rutten |
| 2,115,270 A | 4/1938 | Leash |
| 2,332,081 A | 10/1943 | Hunt et al. |
| 2,362,252 A | 11/1944 | Ellinwood |
| 2,398,603 A | 4/1946 | Soderberg |
| 2,406,387 A | 8/1946 | Lank |
| 2,526,116 A | 10/1950 | Browne |
| 3,045,294 A | 7/1962 | Livezey |
| 3,319,983 A | 5/1967 | Zibell |
| 3,619,963 A | 11/1971 | Omholt |
| 3,705,002 A | 12/1972 | Varlonga |
| 3,890,753 A | 6/1975 | Johansen |
| 4,154,172 A | 5/1979 | Curtis, Jr. |
| 4,449,346 A | 5/1984 | Tremblay |
| 4,641,988 A | 2/1987 | Ganner |
| 4,682,458 A | 7/1987 | Sparrow |
| 4,716,704 A | 1/1988 | Murr |
| 5,004,027 A | 4/1991 | Legler et al. |

(Continued)

FOREIGN PATENT DOCUMENTS

CA 2287104 A1 1/2001

(Continued)

*Primary Examiner* — Victor MacArthur
(74) *Attorney, Agent, or Firm* — Lerner, David, Littenberg, Krumholz & Mentlik, LLP

(57) ABSTRACT

The present invention is an anchoring device for joining three boards. It includes a substantially flat horizontal top element having a top view configuration which includes two sides and has a first predetermined width as measured wide to side at its maximum width between the two sides. There is at least one substantially vertical support member attached to the underside of the top element along an imaginary center line and extending downwardly from the top element for a predetermined length, which has two sides and a second predetermined width as measured at its maximum width. There is a substantially flat horizontal bottom element with two sides and has a third predetermined width at its maximum width. The first predetermined width is greater than the second predetermined width and the third predetermined width, and the third is greater than the second.

22 Claims, 3 Drawing Sheets

U.S. PATENT DOCUMENTS

| | | |
|---|---|---|
| 5,056,286 A | 10/1991 | Bokor |
| 5,071,280 A | 12/1991 | Turner |
| 5,160,211 A | 11/1992 | Gilb |
| D331,470 S | 12/1992 | Mitchell et al. |
| 5,182,891 A | 2/1993 | Slocum |
| 5,243,804 A | 9/1993 | Therrien et al. |
| 5,245,808 A | 9/1993 | Grunewald et al. |
| 5,251,996 A | 10/1993 | Hiller et al. |
| 5,377,732 A | 1/1995 | Fujii et al. |
| 5,419,649 A | 5/1995 | Gilb |
| 5,458,433 A | 10/1995 | Stastny |
| 5,480,117 A | 1/1996 | Fleming, III |
| 5,529,428 A | 6/1996 | Bischof |
| 5,539,599 A | 7/1996 | Wilder |
| 5,564,248 A | 10/1996 | Callies |
| 5,603,580 A | 2/1997 | Leek et al. |
| 5,660,016 A | 8/1997 | Erwin et al. |
| 5,704,181 A | 1/1998 | Fisher et al. |
| 6,012,256 A | 1/2000 | Aschheim |
| 6,363,677 B1 | 4/2002 | Chen et al. |
| 6,442,908 B1 | 9/2002 | Naccarato et al. |
| 6,449,918 B1 | 9/2002 | Nelson |
| 6,460,306 B1 | 10/2002 | Nelson |
| D488,373 S | 4/2004 | Eberle |
| 2002/0121064 A1 | 9/2002 | Erwin |

FOREIGN PATENT DOCUMENTS

| | | |
|---|---|---|
| CH | 278212 A | 10/1951 |
| DE | 4036338 A1 | 6/1991 |
| EP | 863317 A2 | 9/1998 |
| FR | 1217468 A | 5/1960 |
| FR | 1556252 A | 2/1969 |
| FR | 2647837 A1 | 12/1990 |
| GB | 1350754 A | 4/1974 |
| GB | 1567008 A | 5/1980 |
| GB | 2124672 A | 2/1984 |
| JP | 07189451 A | 7/1995 |

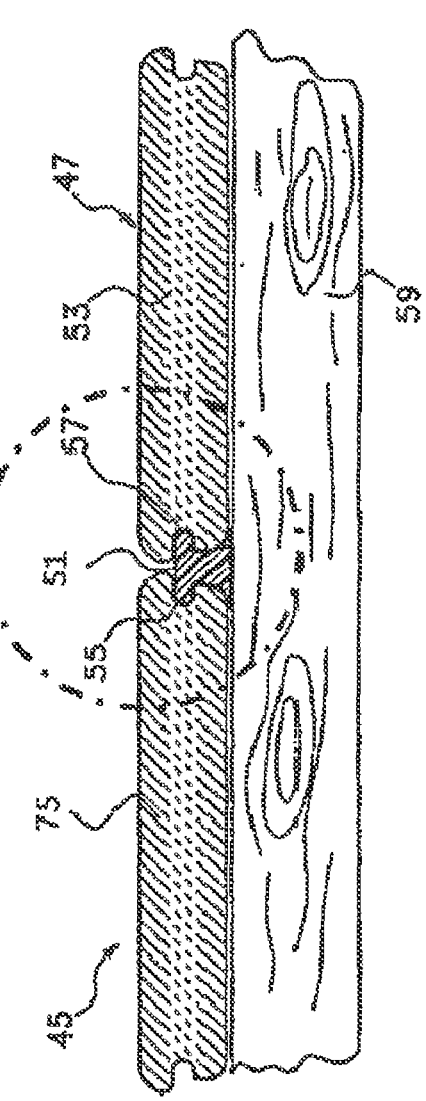

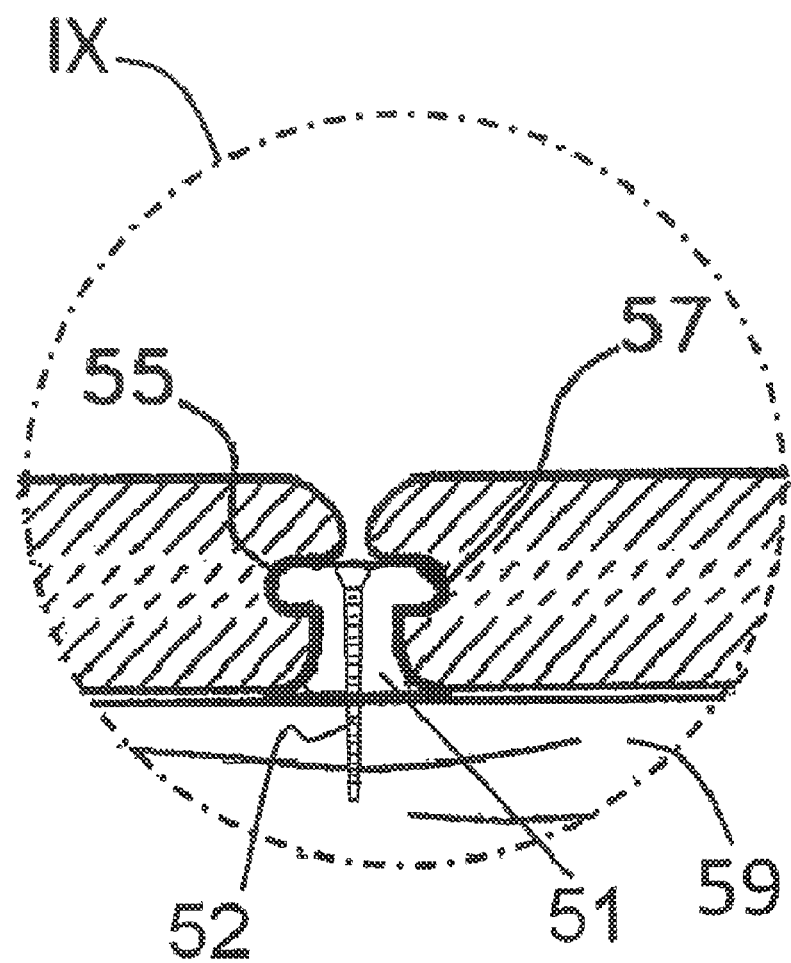

DECKING SYSTEM AND ANCHORING DEVICE

CROSS REFERENCE TO RELATED APPLICATION

This is a divisional of U.S. application Ser. No. 10/037,325, filed on Jan. 3, 2002, the entire disclosure of which is hereby incorporated herein by reference.

BACKGROUND OF THE INVENTION

1. Field of the Invention

The present invention is directed to an improved anchoring device for joining adjacent boards, e.g. decking systems, more specifically, the invention is an anchoring device, as well as a system containing an anchoring device and decking boards in combination. The system provides the ability for pre-setting distances between adjacent boards and attaching to at least one joist board while securing at least one adjacent board. Thus, the anchoring device physically joins two adjacent boards in the same plane to a third, supporting board.

2. Information Disclosure Statement

The following patents are representative of the state of the art for wood joining devices, equipment and methods:

U.S. patent Ser. No. 11/184,080 to D'Arcy describes a structure of the class described, the combination of frame pieces disposed at an angle to each other and plate-like corner irons having angularly disposed flanges, said corner irons being arranged in opposed pairs on the sides of and secured to the ends of meeting frame pieces with their flanges engaging the inner edges thereof in overlapping telescoping relation to each other, the inner flanges having vertical nail slots therein and brads on their edges driven into the frame pieces, the outer flanges having nail perforations opposite the nail slots, there being nails disposed through the said perforations and slots and driven into the frame.

U.S. Pat. No. 2,332,081 to G. M. Hunt et al is directed to a wooden panel. It is described as a panel comprising wooden strips joined along their edges with glue, each strip having at least one groove in its edge matching groove in the edge of the adjoining strip, an asbestos millboard spline fitted in the matching grooves and bridging the joint between the strips, crossbands covering the strips on both sides of the panel, and veneers covering the crossbands.

U.S. Pat. No. 2,362,252 to Ellinwood describes a wall structure of the character described comprising a pair of adjacent wallboard panels having meeting edges, each of said panels being formed with a groove opening into it's meeting edge, the groove in each panel providing an outer lip and an inner lip, said outer lips being in abutting relation, a joining strip permanently secured to the under surface of said outer lips, said inner lips being spaced, a T-shaped connecting member movably positioned in said groove and having a base in spaced relation to said inner lips, and means for anchoring said connecting member to a structural element.

U.S. Pat. No. 2,398,603 to Soderberg describes a joining staple, comprising a metal body having at least two portions extending at right angles to each other and at least two teeth carried upon each of said portions, each of said teeth consisting of a flat substantially rectangular body having a cutting edge extending substantially parallel to its body portion of the cutting edges of all of said teeth being located in one plane, each of said portions having another cutting edge extending between the teeth of that portion, the second mentioned cutting edges being also located in one plane.

U.S. Pat. No. 2,406,387 to Lank describes the method of constructing a plurality of wooden posts each of which has a connector element incorporated therein adjacent each end thereof which method comprises forming a plurality of longitudinally extending grooves in one side of each of a pair of wooden blanks from which the posts are to be formed, forming a transves groove adjacent each end of said side of each of said blanks with the transverse grooves intersecting the longitudinal grooves, providing a pair of connector retaining members with a plurality of seats for receiving connector elements, the number and spacing of said seats in each of said connector retaining members conforming to the number and spacing of the longitudinal grooves in each of said blanks, placing connector elements in each of said seats, positioning said blanks with their grooved sides together and with said connector retaining members in said transverse grooves, bonding said blanks together, and severing the thus bonded assembly along longitudinal lines intermediate said longitudinal grooves.

U.S. Pat. No. 4,641,988 to Ganner is directed to a fitting for releasably joining two structural components. It is illustrated for releasably joining two structural components particularly plate-shaped structural components which extend at a right angle relative to one another, a fitting has a preferably cylindrical locking element which can be inserted either directly in a bore in the first structure component or it can be inserted indirectly in a housing, and a holding piece with a holding projection anchored in the second structural component. In the assembled position, the holding projection & abuts against one or two gripping surfaces of the locking element which gripping surfaces are of, for example, eccentric shape, and the holding projection is pulled toward the locking element when the locking element is turned. The holding piece is constructed plate-shaped and is insertable in a slot in the second structural component.

U.S. Pat. No. 4,682,458 to Sparrow describes a floor composed of parallel spaced beams having flanges and blocks of polystyrene foam which are laid on the flanges to bridge the gaps between the beams. Boards are laid on the polystyrene blocks, and are supported by the blocks, which form load-bearing members of the floor. The blocks may have flanged portions extending over the beams, so as to provide heat insulation.

U.S. Pat. No. 5,004,027 to Legler et al illustrates a biscuit joiner. It is described as a biscuit joiner for cutting semi-elliptical slots in opposing edges of workpieces which are to be joined along those edges includes a housing adapted to be mounted upon the quill of a multi-purpose woodworking tool, which housing encloses a rotary saw blade adapted to be attached to a spindle projecting from the quill on which the housing is mounted. A spring loaded guide projects from the front face of the housing and has a slot therethrough, so that when the front face of the guide is engaged by an edge of a workpiece to be slotted the guide can be pushed inwardly against spring pressure, allowing the rotary saw blade to be exposed and form a slot in the edge of the workpiece. Adjustable stops are provided on the guide so that a desired depth of cut will automatically be made after adjustment. An alternative construction of this biscuit joiner is especially adapted for use in conjunction with a conventional drill press, with the arbor which carries the saw blade being clamped in the chuck on the drive spindle of the drill motor.

U.S. Pat. No. 5,071,280 of Turner describes a sheet metal connector that is provided for use with timber building components of the type that has nails to be driven through the sheet metal into the timber. The connector has substantially U-shaped cuts in the sheet metal to define nailing tongues.

The nailing tongues have a deformation for use in providing a nail entry point so that a nail driven therethrough will serve to drive the nailing tongue into the timber.

U.S. Pat. No. 5,160,211 to Gilb describes a connector for securing a wood railing to a wood post by fasteners which are in shear in relation to all forces imposed upon the railing. The connector is a single piece sheet metal menmer formed in a generally triangular cross section with openings provided for the insertion of the fasteners. The connector is placed on the underside of the railing to eliminate all top nailing or driving of screws through the top side of the rail.

U.S. Pat. No. 5,182,891 to Slocum describes a flooring construction which is provided having a unitary construction with a top layer providing a finished flooring surface and an insulation layer adjacent the top layer. The flooring panel includes an upper portion and a lower portion. The upper portion has a larger dimension than the lower portion and extends outwardly beyond the lower portion. A recessed portion between the upper portion and the lower portion defines a channel A plurality of interlock support elements having a vertical web and an upper horizontal flange are arranged so that the horizontal flange extends into the channel The vertical web extends below the lower portion to raise the flooring.

U.S. Pat. No. 5,251,996 to Hiller et al describes a connecting element for connecting two parts generally in a connection plane has a first portion for connecting the element relative to a first of the parts and second portion for connecting the element relative to the second part. The second portion includes actuation members which on relative movement of the parts substantially along the connection plane urge the parts forcefully towards each other.

U.S. Pat. No. 5,377,732 to Fujii et al illustrates a wood joining structure and method thereof. It is described as a technique is provided for joining wood members. A plurality of slits are formed on the end portions of wood pieces desired to be joined, and the end portions are abutted with corresponding slits in alignment to form a common surface. Each of the abutted wood end portions is fixed by temporary fixing means to a desired joining state. Thereafter, an adhesive agent is applied into the interior surfaces of the slits. Connecting plates, e.g., made of a reinforced plastic material coated with the adhesive agent, are inserted into the aligned slits. The adhesive agent is then hardened.

U.S. Pat. No. 5,419,649 to Gilb describes an intermediate rail to post connection including a sheet metal connector for attaching a wood intermediate rail to a wood post is disclosed. The sheet metal connector is preferably formed with a base member, an integral seat member and a post engaging flange. Preferably four fasteners which may be either screws or nails are inserted through suitable openings in the sheet metal connector. Two of the fasteners pierce the sheet metal connector, the intermediate rail and the post in such a way as to be in double shear. The other two fasteners are inserted through the sheet metal connector directly into the wood post. The sheet metal connector is placed on the underside of the intermediate rail and all fasteners are therefore inserted from the underside of the intermediate rail.

U.S. Pat. No. 5,458,433 to Stastny explicates a biscuit and joint made using same. It is described as a biscuit having octagonal outer periphery is used to form a joint between first and second workpieces. The biscuit fits within arcuate slots formed in the workpieces, with glue placed in the slots and/or on the biscuit before the joint is put together. The biscuit is made of an anhydrous compressed wood.

U.S. Pat. No. 5,480,117 to Fleming, III describes a bracket for mounting a rotary lock member in the frame of a panel which is provided. The bracket is a preferably U-shaped body having a base and two legs extending therefrom. The inner dimension of the bracket is chosen to allow insertion of a rotary lock member therein. Panel engaging steps and protrusions are located on the outside surface of each leg for engaging the frame material. The legs of the bracket are biased inwardly towards one another, such that when a locking member is inserted therein, the legs are pressed outwardly, driving the protrusions into the frame material. A number of bores are located in the bracket to allow supplemental locking members to lock the bracket to the frame.

U.S. Pat. No. 5,529,428 to Bischof is directed to a metallic structural element for connecting workpieces consisting of wood, woodworking material or plastic. It is described as a metallic structural element for connecting workpieces consisting of wood, woodworking material or plastic, consisting of a lamellar part, which provides the non-positive connection with the first workpiece provided with a groove and a transverse hole, and a bolt-like part which, through screwing or pinning, realizes the non-positive connection with the second workpiece provided with a longitudinal hole. The lamellar part has, in the center, a hole which is at right angles to the plane of the lamella and is intended for fixing in the groove of the workpiece. Variants having a wing-like lonr or rectangular short lamellar part and a bolt—like part in the form of a conical wood screw, cylindrical screw, screw having a metal thread, threaded sleeve or pin. Accessories: screwing tool and drilling template.

U.S. Pat. No. 5,564,248 to Callies describes a construction hanger for supporting a joist, rafter or the like to a support beam, in which the hanger is provided with a holddown tab for insuring proper seating of the joist to hanger during the installation process. The invention also relates to a method of making such a hanger.

U.S. Pat. No. 5,603,580 to Leek et al describes a positive fastener-angling device for positioning an elongated fastener with respect to the face of a sheet metal connector and a wood member only at a preselected angle which is substantially less than 90 degrees by forming a slit-cut in the sheet metal connector by means of a die which progressively at the same station, forms a fastener guideway in the shape of a half cone. The fastener opening and the guideway are dimensioned so that the fastener can only penetrate the sheet metal connector at a preselected angle set at the factory.

U.S. Pat. No. 5,660,016 to Erwin et al describes an extruded plastic decking plank for mounting to an underlying support structure, the plank having a rigid foam core, a resilient outer plastic shell, and a clamping portion for securing the plank to the support structure. The top surface of the plank can be provided with a non-slip surface. The invention also includes an attachment system for securing such decking planks to a support structure by engaging the clamping portions of the decking planks onto clamps or hold down blocks which are secured onto the support structure, and which permit relative motion between the planks and the structure in the planks lengthwise direction to prevent: stress and buckling caused by uneven expansion.

Notwithstanding the prior art, the present invention is neither taught nor rendered obvious thereby.

SUMMARY OF THE INVENTION

The present invention is an anchoring device for joining three boards. It includes a substantially flat horizontal top element having a top view configuration which includes two sides and has a first predetermined width as measured side to side (This first predetermined width is measured at a maximum width between the two sides). The top element has an imaginary center line and there is at least one substantially vertical support member attached to the underside of the top element along the imaginary center line and extending downwardly therefrom for a predetermined length. This substantially vertical support member has two sides and a second predetermined width as measured side to side at its maximum width. There is also a substantially flat horizontal bottom element having a flat bottom view configuration which includes two sides and has a third predetermined width as measured side to side at its maximum width.

The first predetermined width is greater than both the second predetermined width and the third predetermined width, and the third predetermined width is greater than the second predetermined width. By this configuration, the present invention anchor device is adapted to maintain the top element in a predetermined position during use for joinder of two adjacent boards which have been pre-cut with receiving slots, and to position the bottom element upon a support board on which the two adjacent boards rest for attachment of the anchoring device to the support board for anchoring and support of the two adjacent boards.

Preferably, the anchoring device bottom element has a generally trapezoidal shape with its greatest width at a trapezoidal base. Also, the vertical support member may have a plurality of recesses with support columns located therebetween.

The anchoring device of the present invention may be fabricated with any available material, but is preferably made of molded plastic material capable of having a metal fastener driven through.

The present invention also relates to a decking system. It includes a plurality of decking boards, each decking board having a top, a bottom, two sides, and two ends, and at least one groove located along one of the sides. Preferably, there is a groove on both sides, except that end pieces may only have one groove. The groove adapted to receive the anchoring device described above, which is included in the system.

In preferred embodiments, the boards have an upper portion above the slots which is wider than a lower portion below the slots.

BRIEF DESCRIPTION OF THE DRAWINGS

The present invention should be more fully understood when the specification herein is taken in conjunction with the drawings appended hereto wherein:

FIGS. 5 and 6 show alternative embodiment top views of present invention anchoring devices;

FIG. 7 shows a cross-sectional, end view of the present invention device shown in FIGS. 1 through 3 but being attached to a joist and a first deck board and a second deck board where both deck boards are supported by that joist;

FIG. 8 shows a cross-sectional, end view of a preferred present invention decking system board; and FIG. 9 shows in enlarged view a portion of the cross-sectional view of FIG. 7, as indicated by the circle 1X. The enlarged portion in FIG. 9 depicts the attachment of anchoring device 51 by screw 52 driven therethrough and into beam 59. The respective sides of the top element portion of device 51 engage respective receiving slots 55, 57 of the decking boards.

DETAILED DESCRIPTION OF THE PRESENT INVENTION

Figure 1:
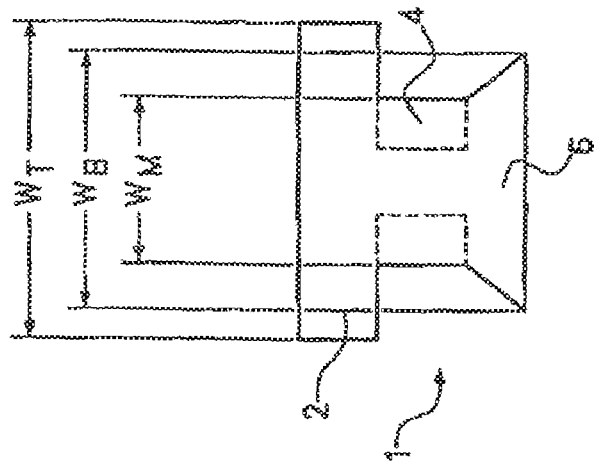
FIG. 1 illustrates a top view of one preferred embodiment of the present invention anchoring device.

In FIG. 1, there is shown a top view of present invention anchoring device 1. Device 1 includes a top element 2 having a flat top surface 3 as shown, and a top view shape of a rectangle. It includes walls 5 and 7, which are parallel to one another in preferred embodiments, but need not be parallel to be within the scope of the present invention. In this case, they are perfectly symmetrical and have flat sidewalls 5 and 7. Perfect symmetry is preferred but not essential. Without exceeding the scope of the present invention, these top element shapes could be slightly modified, such as having non-linear segments, e.g., arcs or linear segments at angles.

Top element 2 also includes an imaginary attachment line 8 below which extends a vertical support member and a bottom element.

Figure 2:
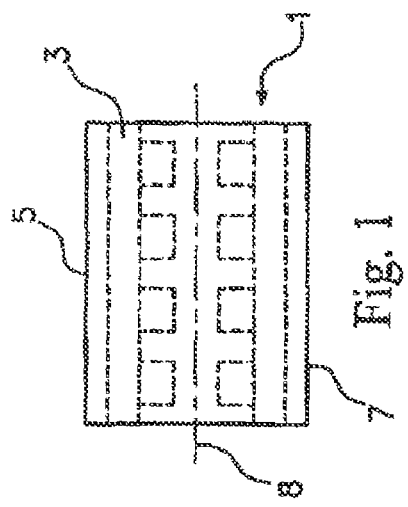
FIG. 2 illustrates a front view.
Figure 3:
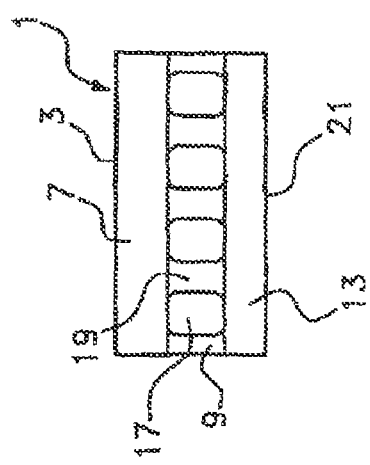
FIG. 3 illustrates an end view thereof.

FIGS. 2 and 3 show front and end (right side) views, respectively of device 1 shown in FIG. 1. Thus, device 1 includes top element 2, a vertical support member 4 with walls 9 and 11 and recesses such as recess 17, creating support columns, such as column 19. Bottom element 6 has a substantially flat horizontal bottom surface 21 and tapered walls 13 and 15. Anchoring device 1 has a predetermined height so as to rest on a joist in such a way as to establish anchor top element 2 at a predetermined height from the joist for attachment of two adjacent boards thereto which have pre-cut slots corresponding thereto.

Figure 4:
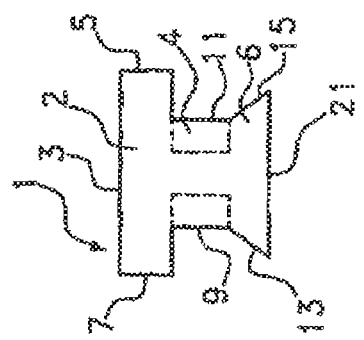
FIG. 4 illustrates a detailed end view of the present invention anchoring device shown in FIGS. 1, 2 and 3, with relative width illustrated.

FIG. 4 shows a blown up end view of anchoring device 1 as shown in FIG. 3, with identical parts identically numbered in part, and with width designations, as illustrated. Specifically, in FIG. 4, top element 2 has a width $W_T$, as measured from side to side at its maximum width. Vertical support member 4 has width $W_M$, as measured from side to side at its maximum width. Likewise, bottom element 6 has a width $W_B$, as measured from side to side at its maximum width. It is important to note that $W_T$, the first predetermined width, being the width of top element 2, is greater than both $W_M$, the predetermined width of vertical support member 4, as well as $W_B$, the predetermined width, being a third predetermined width of bottom element 6. In other words, the width of the top element is greater than both the width of the vertical support member and the width of the bottom element. Moreover, the width of bottom element 6, $W_B$, while it is less than width $W_T$ of top element 2, it is also greater than the width of vertical support member 4, $W_B$. These critical relationships allow for maximum support of adjoining slotted boards while minimizing the space between the boards to typical or conventional deck spacing.

FIG. 5 and FIG. 6 show top views, respected with, of present invention anchoring device 31 and 41 to nearly illustrate that the top view of the top element need not be of parallel sides. Anchoring device 31 of FIG. 5 has parallel sides which are tapered at both ends while anchoring device 41 of FIG. 6 has subsequently not parallel, non-symmetrical sides. Parallel symmetrical, mirror image sides are preferred in the present invention anchoring device but as now can be seen, variations may be made without exceeding the scope of the present invention.

FIG. 7 shows present invention anchoring device 51 in use. The cross-section presented in FIG. 7 is taken in a plane generally perpendicular to the long direction of horizontal beams (decking boards) 45 and 47 and the long direction of anchoring device 51 and generally parallel to the sides of joist beam 59. Anchoring device 51 is inserted into pre-cut slot 55 of horizontal beam 45, shown in its end view of cut wood 51. A staple, nail or screw is passed through anchoring device 1 into joist beam 59. Large staples are preferred and simplest for attachment. This anchor attaches device 51 to joist beam 59 and establishes the elevation of top element 2 so as to match with slot 55. As depicted in FIG. 7, the cross-section of anchoring device 51 may include a bottom portion having slightly curved sides to accommodate use in decking installations in which the decking boards have curved sides, such as those of the upper portion 61 and the lower portion 63 of the sides of decking board 45, as shown in FIG. 8.

Next beam 47 with its slot 57 in its end view of cut wood 53 will be placed adjacent to anchoring device by being slid into position with the top element of anchoring device 1 fitting into slot 57 and the bottom of beam 47 resting on joist 59. By this method, anchoring device 1 attaches all three boards to one another as the top element aspects are typically tight-fitting. The bottom element also aids in placement and security by fitting under the edge of the beams as shown in the Figure. Thus, for example, decking boards may be attached without the need for nails or screws entering the beams themselves from the top.

FIG. 8 shows a detailed cross-sectional view of beam 45 from FIG. 7, the cross-section being taken in a plane generally perpendicular to the long direction of beam 45. This is a preferred component of the present invention decking system. As can be seen, the slot 55 represents a midpoint or approximate midpoint imaginary line 65 divides the beam into an upper or top portion 67, and a lower or bottom portion 69. As can be seen, the top portion 67 has a greater width $W_{TB}$, than the bottom portion $W_{BB}$. This provides for tightness of the anchoring device, increases stability and hides more of the anchoring device from a top view, enabling tight top portion beam spacing, yet enabling thicker anchoring devices for strength and stability.

Obviously, numerous modifications and variations of the present invention are possible in light of the above teachings. It is therefore understood that within the scope of the appended claims, the invention may be practiced otherwise than as specifically described herein.

The invention claimed is:

1. An anchoring device comprising:
a horizontally-extensive top element having at least two sides, the horizontally-extensive top element having a first width measured between the at least two sides;
a support member extending downwardly from the horizontally-extensive element and having at least two sides, the support member having a second width measured between the at least two sides thereof; and
a horizontally-extensive bottom element coupled to the support member and having at least two tapered sides, the horizontally-extensive bottom element having a third width measured between the at least two tapered sides, the third width being greater than the second width and less than the first width, the at least two tapered sides being constructed and arranged to engage substantially vertically-extensive surfaces of slotted boards so that the horizontally-extensive top element extends into slots in the boards;
wherein the support member has a plurality of recesses extending along at least one of the at least two sides thereof;
wherein the recesses each extend partially through the second width of the support member.

2. The anchoring device according to claim 1, wherein the horizontally-extensive bottom element has a substantially trapezoidal shape.

3. The anchoring device according to claim 1, wherein the first width is greater than the second width.

4. The anchoring device according to claim 1, wherein the support member has a plurality of vertically-extensive support columns positioned along at least one of the at least two sides thereof.

5. The anchoring device according to claim 1, wherein at least one vertically-extensive support column is positioned between two recesses of the plurality of recesses.

6. The anchoring device according to claim 1, wherein the horizontally-extensive top element is wholly or partly made of molded plastic.

7. The anchoring device according to claim 1, further comprising a fastener extending through the horizontally-extensive top element.

8. The anchoring device according to claim 7, wherein the fastener includes a screw.

9. The anchoring device according to claim 7, wherein the fastener extends through the support member and the horizontally-extensive bottom element.

10. The anchoring device according to claim 7, wherein the horizontally-extensive bottom element includes a substantially flat horizontal bottom surface constructed and arranged to engage a joist board and wherein the fastener extends through the joist board to secure the anchoring device to the joist board.

11. The anchoring device according to claim 1, wherein the horizontally-extensive top element has a center line and wherein the support member extends downwardly from the horizontally-extensive top element adjacent the center line.

12. The anchoring device according to claim 1, wherein the at least two sides of the horizontally-extensive top element are rounded.

13. The anchoring device according to claim 1, wherein the at least two sides of the horizontally-extensive top element are substantially parallel to each other.

14. The anchoring device according to claim 1, wherein the horizontally-extensive top element has at least two tapered ends.

15. The anchoring device according to claim 1, wherein at least one of the plurality of recesses extends no more than approximately 0.125 inches into the second width of the support member.

16. The anchoring device according to claim 1, wherein at least one of the plurality of recesses extends no more than approximately 0.03 inches into the second width of the support member.

17. The anchoring device according to claim 1, wherein at least one of the plurality of recesses extends between approximately 0.02 inches and approximately 0.05 inches into the second width of the support member.

18. An anchoring device comprising:
a horizontally-extensive top element having at least two sides, the horizontally-extensive top element having a first width measured between the at least two sides;
a support member extending downwardly from the horizontally-extensive element and having at least two sides, the support member having a second width measured between the at least two sides thereof;
a horizontally-extensive bottom element coupled to the support member and having at least two tapered sides, the horizontally-extensive bottom element having a third width measured between the at least two tapered sides, the third width being greater than the second width and less than the first width, the at least two tapered sides being constructed and arranged to engage vertically-extensive surfaces of slotted boards so that the horizontally-extensive top element extends into slots in the boards;

a plurality of vertically-extensive support columns extending along each of the at least two sides of the support member; and a plurality of recesses disposed along each of the at least two sides of the support member, each recess being located adjacent a vertically-extensive support column of the plurality of vertically-extensive support columns, each recess extending partially through the second width of the support member.

19. The anchoring device according to claim 18, wherein each of the plurality of support columns spans from a bottom end of the horizontally-extensive top element to an upper end of the horizontally-extensive bottom element.

20. The anchoring device according to claim 18, wherein each of the plurality of recesses spans from a bottom end of the horizontally-extensive top element to an upper end of the horizontally-extensive bottom element.

21. The anchoring device according to claim 18, wherein the horizontally-extensive bottom element has a substantially trapezoidal shape.

22. The anchoring device according to claim 18, further comprising a fastener extending through the horizontally-extensive top element.

* * * * *

UNITED STATES PATENT AND TRADEMARK OFFICE
CERTIFICATE OF CORRECTION

| | | |
|---|---|---|
| PATENT NO. | : 8,287,206 B2 | Page 1 of 1 |
| APPLICATION NO. | : 13/024674 | |
| DATED | : October 16, 2012 | |
| INVENTOR(S) | : Harry W. Eberle, III | |

It is certified that error appears in the above-identified patent and that said Letters Patent is hereby corrected as shown below:

Title page, item (57)

Line 4 of Abstract, "wide" should read -- side --.
Line 12 of Abstract, "has" should read -- having --.

In the Specification

Column 1, line 50, "it's" should read -- its --.
Column 2, line 29, after "projection" delete "&".
Column 2, line 51, insert -- - -- between "spring loaded".
Column 3, line 20, after "channel" insert -- . --.
Column 3, line 24, "describes" should read -- describing --.
Column 3, line 34, after "technique" delete "is".
Column 3, line 46, after "wood post" delete "is disclosed".
Column 3, line 60, after "periphery" delete "is".
Column 4, line 23, "having" should read -- have --.
Column 4, line 24, "lonr" should read -- long --.
Column 4, line 40, after "station" delete ",".
Column 4, line 52, insert -- , -- between "hold down".
Column 5, line 22, after "support" delete ":".
Column 5, line 38, after "groove" insert -- is --.
Column 6, line 54, "respected with" should read -- respectively --.
Column 6, line 55, "device" should read -- devices --.

Signed and Sealed this
Eleventh Day of August, 2015

Michelle K. Lee
*Director of the United States Patent and Trademark Office*